Sept. 18, 1956 M. K. HAYNES 2,763,851

GATED DIODE TRANSFER CIRCUITS

Filed Aug. 25, 1953 2 Sheets-Sheet 1

INVENTOR
MUNRO K. HAYNES
BY
JOHN ALDEN HALL
ATTORNEY

INVENTOR
MUNRO K. HAYNES
BY
JOHN ALDEN HALL
ATTORNEY

United States Patent Office 2,763,851

Patented Sept. 18, 1956

2,763,851

GATED DIODE TRANSFER CIRCUITS

Munro King Haynes, Poughkeepsie, N. Y., assignor to International Business Machines Corporation, New York, N. Y., a corporation of New York Application August 25, 1953, Serial No. 376,287

3 Claims. (Cl. 340—174)

This invention relates to information handling systems of the type in which binary information is stored magnetically and transferred under controlled conditions from place to place, the storage and the transfer operations being effected by pulses of transient electrical current.

The magnetic storage of information in bistable magnetic devices is known. Core material having a markedly rectangular hysteresis loop where the retreat from saturation in either direction does not substantially diminish the field strength may be driven to one or another of its stable points of remanence by associated coils for applying suitable magnetomotive forces. While such a core may be driven to either of its stable states by steadily applied magnetomotive forces, the same results may be obtained through the use of transient electric currents and since the manner in which the state of the core is noted is by observation of a transient accompanying a change of state, the system as a whole is adapted to transient current operations.

If one of the stable states is arbitrarily designated binary 0 the other state will be binary 1. When a change of state occurs there is a sudden and very rapid collapse of the field and an equally rapid build up in the other direction, which may be observed by the creation of a transient current in one or the other direction in a coil whose magnetic circuit is interlinked with the said core. This is spoken of as an output coil.

The transient current produced in this output coil is useful for transmitting the stored information to some other location, as for instance, into the arithmetic unit of a computer, when the paths for its transmission have been prepared.

An object of the present invention is the provision of means for preparing a transfer path by introducing therein a potential which will add to the potential of a pulse and definitely to render it of a magnitude sufficient for the registration of a bit of information in another binary element or conversely to subtract from the potential of a pulse to render it definitely insufficient for the registration of such bit of information.

In accordance with the present invention switching is accomplished not in the conventional manner of opening and closing transmission paths but by introducing therein additional potentials for enabling or for inhibiting the effectiveness of pulses transmitted from one point to another.

The enabling or the inhibiting potentials may be introduced into a transmission path either in the form of steady state direct current potentials or by poled transients. Where operations admit of the comparative long times necessary for the switching in of such steady state potentials they may be employed, but generally speaking the devices with which the present invention is concerned are adapted to extremely high speed operation and only in exceptional cases is there time afforded for switching such steady state potentials.

Another feature of the invention is the use of pulse transformers for introducing enabling or inhibiting potentials into a transmission circuit coincident with the creation and transmission of a read-out pulse. A pulse transformer, like the magnetic storage unit is a set of two or more windings having their magnetic circuits interlinked with a core of magnetic material. The magnetic material of the pulse transformer may be energized or even saturated but when the energization is relaxed the field will retreat substantially to zero. Such pulse transformers exhibit the characteristics of an air cored coil and therefore do not have the two definite stable states of the magnetic storage element.

By the use of a pulse transformer a pulse may be created in a secondary winding thereof and transmitted without dependence on the previously established state of the core. If this pulse is created by coincident switching it may be used to introduce an enabling or an inhibiting potential into a transient current transmitting path.

Other features will appear hereinafter.

The drawings consist of two sheets having seven figures, as follows.

Figure 1:
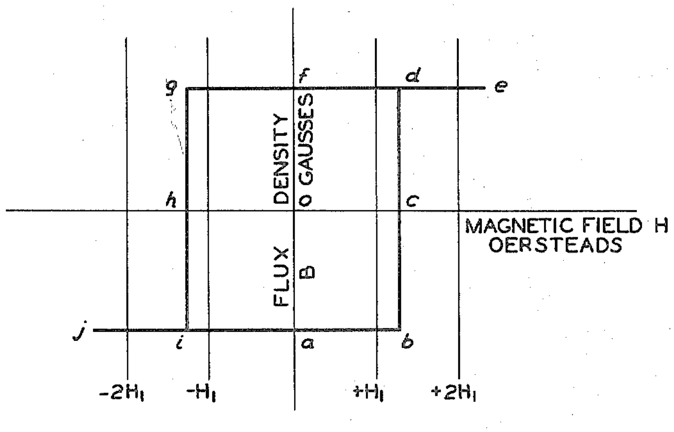
Fig. 1 is an idealized hysteresis loop of the magnetic material used in the magnetic storage cores employed in the present invention.

Bistable magnetic devices comprising one or more windings having their magnetic circuits interlinked with a core of magnetic material characterized by a substantially rectangular hysteresis loop are conventional. The operation of such binary devices may be explained by reference to Fig. 1 showing an idealized hysteresis loop. The point *a* is one point of remanence and the point *f* is another. Assuming the core to be in the state represented by point *a*, it may be explained that if a positive magnetomotive force of $H_1$ is applied to the core and then relaxed, the core will return to the point *a*. Likewise, if a magnetomotive force of $-H_1$ or $-2H_1$ or more is applied and then relaxed, the core will return to the point *a*. However, if a positive magnetomotive force sufficient to reach the knee of the curve is applied, such as $+2H_1$, then a change of state will occur and the curve *abcde* will be traced and when this force is relaxed the core will return to the point of remanence *f*. Again any positive magnetomotive force or a negative magnetomotive force insufficient to reach the knee of the curve will not alter the established condition.

If an output coil is interlinked with this core then any change in state, by the collapse of the field and the building up of the field in the opposite direction, will appear as a pulse therein. Usually only the change of state from point *f* to point *a* is utilized as this may signalize the fact that binary 1 had been stored in the core. In such cases the output circuit usually includes a diode to limit current flow to one direction.

The present invention employs pulse transformers,

These devices each comprise two or more windings having their magnetic circuits interlinked with a core of magnetic material, markedly different from the bistable material above explained. The core of a pulse transformer is not bistable, that is, it does not exhibit appreciable hysteresis, so that the output faithfully reflects the input.

The present invention is an improvement over the invention disclosed in my co-pending application Serial Number 290,677, filed May 29, 1952.

Figure 2:
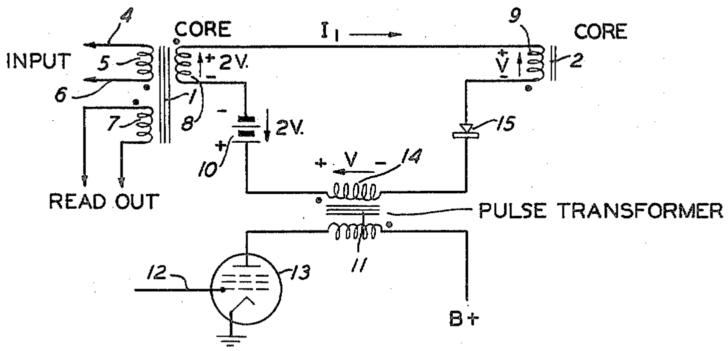
Fig. 2 is a schematic circuit diagram of a means to transfer information characterized by the use of a pulse transformer used in conjunction with conventional means for causing a change in state in one core to cause a change in state in another.

Fig. 2 shows two bistable magnetic cores 1 and 2. On core 1, there are three windings 5, 7 and 8. Winding 5 is the input winding through which binary information is stored in this core 1. Winding 7 is a read-out winding into which a pulse is entered to cause the return of the core to binary 0 (remanence point *a*) from binary 1 (remanence point *f*) if the core had previously been driven to this state. If when the read-out pulse is applied to winding 7 the core 1 is at binary 0, then no change in state will occur. When the read-out pulse is applied to winding 7 and a change of state occurs, a pulse will be delivered by the output winding 8, used herein to transmit such a pulse to core 2. Winding 9 on core 2 is an input winding which is used to enter binary information into core 2. Battery 10 is used to provide a bias potential to the circuit, and diode 15 is used to prevent current flow from battery 10. One winding of the pulse transformer 11 is included in series with the battery 10, the windings 8 and 9 and the diode 15, so that such pulses may aid or oppose the potential of the bias battery 11 as will appear hereinafter. The pentode 13 is used to provide this voltage pulse, which gates the circuit for the transfer operation. The pentode 13 is normally non-conducting but will pass on a positive pulse delivered thereto over the grid connection 12.

It will appear hereinafter that the polarity of the pulse transformer 11 may be arranged so that the voltage pulse which it introduces into the transfer circuit will either allow or inhibit the transfer of information from core 1 to core 2.

Assuming that core 1 is storing binary 0, that is, it is at remanence point *a*, a read-in current flowing in the direction from conductor 4, through winding 5 to conductor 6 will cause a flux reversal to occur in this core and thus drive the core from binary 0 to binary 1, where this state will be maintained until some further operation takes place. The storage of binary 1 will be maintained indefinitely without expenditure of power and will not be disturbed by power supply failure.

Core 1 is now storing binary 1, and it is desired that this information be transferred to core 2. A read-out pulse is therefore applied to winding 7 so that current flows through this winding in a direction opposite to the current flow through winding 5 when binary 1 was entered (as indicated by the polarity marking—a dot at one end of the winding). This read-out current causes a flux reversal to occur in core 1 so that a voltage 2V is induced in winding 8, in a direction opposed to the voltage of the battery 10. Providing that the pentode 13 is not active, then the voltage induced in the winding 8 is ineffective as it is equal and opposite to the bias battery voltage. Consequently, an output signal cannot be developed across winding 9 or core 2, and the information originally stored in core 1 will be forever lost.

However, if it is desired to transfer the information in core 1 to core 2, it is necessary to cause the pulse transformer 11 to deliver a pulse in coincidence with the read-out pulse applied to winding 7. By applying a positive pulse to the grid wire 12, the pentode 13 will be rendered fully conducting to produce by transformer action a voltage pulse of a value V across winding 14 of the pulse transformer 11. The polarity of this pulse will be positive on the dot marked end of the winding and in a direction to aid the 2V pulse being read out of winding 8. A current $I_1$ will therefore flow in the direction indicated, in opposition to the polarity of the bias battery

10. That is the addition of the voltages produced by the windings 8 and 14 is sufficient to overcome the bias voltage and to drive a current $I_1$ through the circuit, whereby a counter voltage will appear across the winding 9 as indicated and the core 2 will be driven from binary 0 to binary 1.

Thus, if a binary 1 is stored in core 1, it will be transferred to core 2 upon the coincidence of voltage pulses being applied to winding 7 and the grid wire 12 to the pentode 13. The binary 1 stored in core 2 may be read out at a later time in the same manner.

The read-out pulse for core 2 must not occur in coincidence with the read-out pulse for core 1 since information cannot be read into and out of core 2 simultaneously. It is obvious that read-in and read-out pulses applied simultaneously will not produce a pulse of useful magnitude since such pulses are equal and opposite.

The circuit of Fig. 2 may be rearranged so that binary information can be transferred from a first core to a second core at any time except during the time that the pentode is rendered fully conducting. That is, transfer of information would be inhibited by the application of a positive pulse to the grid of the pentode, as shown in Fig. 3.

A read-in pulse supplied to winding 25 of core 21 will change the state of this core from binary 0 to binary 1 and thus store a 1. This stored 1 may be read out of the core by applying a pulse to winding 27 in the same manner as hereinbefore described in connection with Fig. 2. The application of a read-out pulse to winding 27 will cause a flux reversal to occur in core 21 which will cause a voltage 2V to be induced in winding 28. The polarity of this voltage is + on the dot end of the winding. Assuming the pentode 33 to be not active, no voltage will appear across the winding 34 of the pulse transformer 31, whereby the potential V of the bias battery 30 will be overcome by the pulse from winding 28 and a current $I_2$ will flow in the direction indicated. This current flowing through winding 29 will cause a flux reversal to occur in core 22, whereby the binary 1 originally stored in core 21 is transferred to core 22.

Had it been desired to inhibit the transfer of information from core 21 to core 22, the grid 32 would have been positively pulsed in coincidence with the read-out pulse applied to winding 37. A voltage V induced across winding 34, positive on the dot end of this winding, will aid the bias battery 30 and opposing the voltage induced across winding 28. Thus, the algebraic sum of the various voltages is zero and no transfer occurs.

Figure 3:
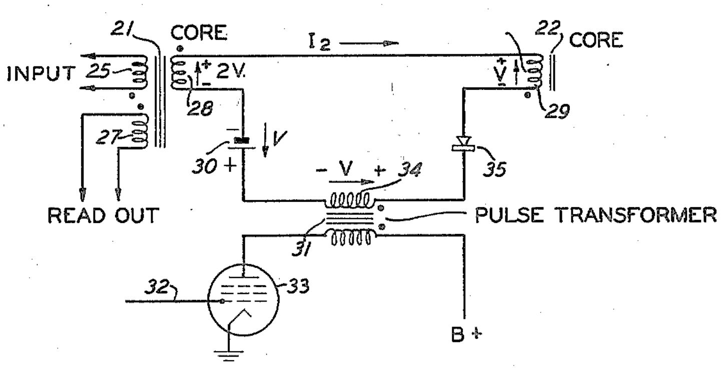
Fig. 3 is a schematic circuit diagram expressing a variation of the circuit of Fig. 2.
Figures 4, 5, 6, 7:
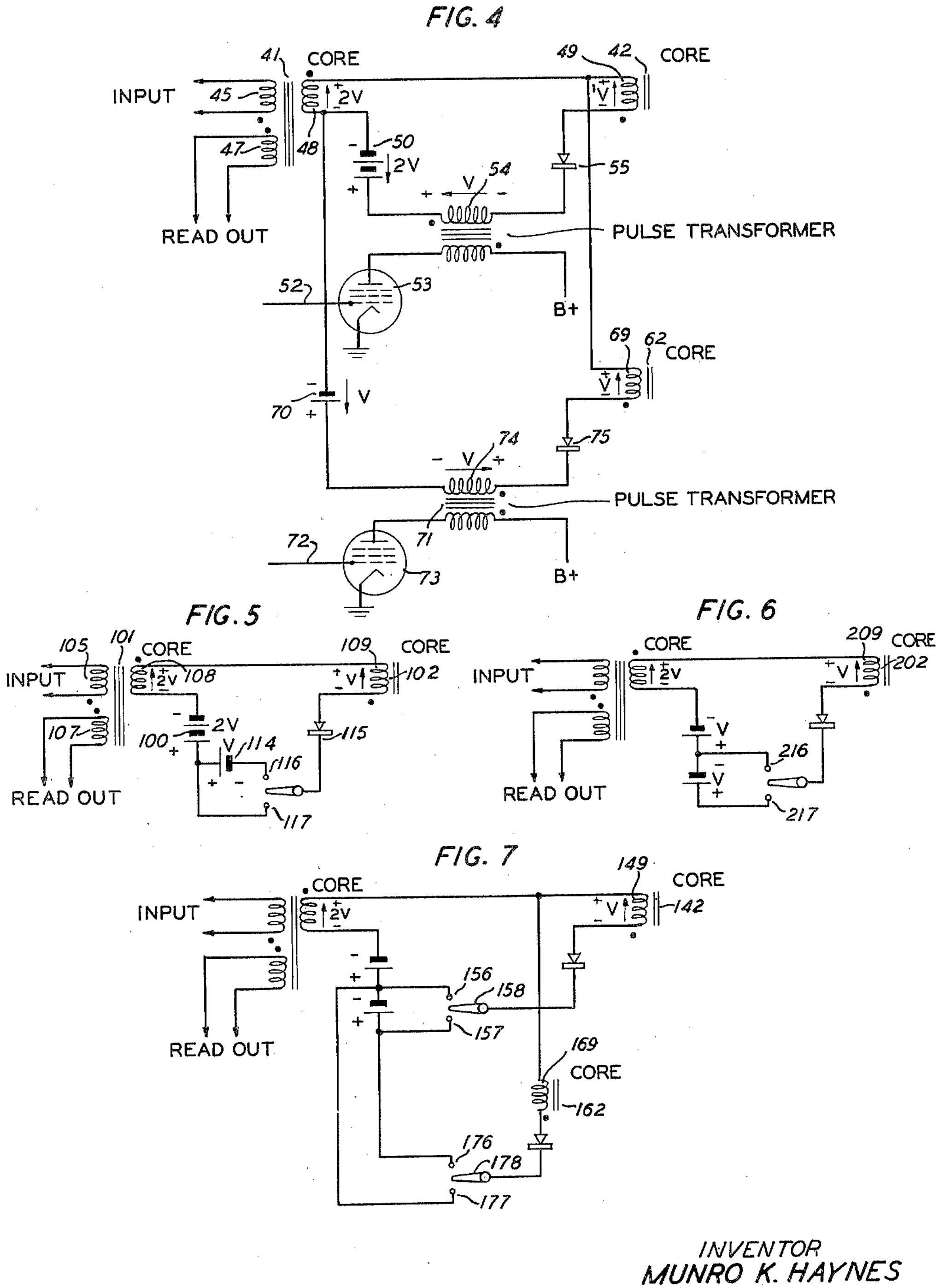
Fig. 4 is a schematic circuit diagram showing how information stored in one core may be selectively transferred to other cores.
Fig. 5 is a schematic circuit diagram showing selectively applied voltages coincidently applied to the transfer circuit in place of the pulses produced by the pulse transformer.
Fig. 6 is a schematic circuit diagram showing a variation of the circuit of Fig. 5.
Fig. 7 is a schematic circuit diagram showing a combination, using the basic circuit of Fig. 6 which will allow selective transfer to different cores.

A combination of the circuits of Figs. 2 and 3, shown in Fig. 4, may be arranged so that the information stored in a single input core 41 may be selectively transferred to any one core or combination of cores connected across the output winding of the input core. This circuit shows only two circuits connected across the output winding 48 but the principle involved may be applied to more extensive circuits where a larger plurality of circuits are employed. The operation of this circuit is the same as hereinabove explained.

A binary 1 stored in core 41 may be transferred to output storage core 42 only by applying a read-out pulse to winding 47 and coincident positive pulses to the grid wires 52 and 72. The positive pulse at 52 gates the circuit for core 42 and the positive pulse to the grid wire 72 gates the other circuit against the core 62 whereby the binary 1 is transferred to the core 42 and core 62 remains unaltered.

A binary 1 stored in core 41 may be transferred to core 62 only by not applying positive pulses at 52 and 72 in coincidence with the read-out pulse at winding 47.

A binary 1 stored in core 41 may be simultaneously transferred to both core 42 and core 62 by applying a positive pulse at 52 in coincidence with the read-out pulse at 47 and by not applying a positive pulse at 72.

If additional transfer circuits of the type shown in

Fig. 2 and Fig. 3 are connected in parallel across winding 48, the transfer of a binary 1 may be made to the associated output storage cores on a selective basis in the manner above described, by the selective operation of the gate tubes.

It should be noted that the gating pentode tubes and pulse transformers can be replaced by any other voltage source capable of being switched in and out of the transfer circuit without breaking the continuity thereof. Figs. 5, 6 and 7 show various general examples of this, utilizing batteries and conventional manual switches. The batteries need not be capable of delivering appreciable power and may be replaced by any voltage source capable of delivering power determined by the back resistance of the diode. The switches may be operated in any conventional manner in accordance with the speed of operation which may be required.

It has been shown in the operation of the previously described circuits that the function of the gating voltage induced in the pulse transformers was effectively to subtract from the diode biasing voltage 10 in Fig. 2 so that the biasing voltage was 2V without the gating voltage and V with the gating voltage, and to add to the diode biasing voltage 30 in Fig. 3 so that the biasing voltage was V without the gating voltage and 2V with the gating voltage. On reading a binary 1 out of a storage core, a transfer will occur when the diode bias is V and will be inhibited when the diode bias is 2V.

The circuits of Figs. 5, 6 and 7 serve these same functions. Figs. 5 and 6 show two variations of the basic circuit since each will allow or inhibit a transfer. Fig. 7 shows a combination, utilizing the basic circuit of Fig. 6 which will allow selective transfer to different output cores.

Consider Fig. 5. If the switch is connected to contact 116, the diode bias will be the difference between the voltages of batteries 100 and 114 since they are connected in series opposition and if the core 101 is pulsed at this time to read out a binary 1, it will be transferred to core 102. If, on the other hand, the switch is connected to contact 117 then the bias voltage will be 2V and a transfer will be inhibited.

In accordance with the circuit of Fig. 6, if the switch is connected to contact 216, the bias voltage will be V so that a transfer will be effected, but if the switch is in connection with contact 217 the bias will be 2V and a transfer will be inhibited.

In the circuit of Fig. 7, if both switches are up, that is, if switch 158 is connected to contact 156 and switch 178 is connected to contact 176, the circuit having as an element the winding 149 will have a diode bias of V and a transfer will be effected to core 142, while the circuit having the winding 169 will have a bias of 2V and no transfer to core 162 may be made. If the two switches are in connection with their other contacts, the conditions will be reversed and a transfer to core 162 may be made but not to core 142. If the switches act in opposite directions, that is, if switch 158 is connected to contact 156 and switch 178 is connected to contact 177, transfers may be made to both cores 142 and 162, and lastly, if switch 158 is set on contact 157 while switch 178 is set on contact 176, then transfers to both cores 142 and 162 will be inhibited.

Any number of output windings, within the driving power capabilities of the input core, may be connected across the output winding of the input core, each output winding having its own switching circuit, and each such switching circuit may be arranged independently so that any desired transfer or inhibiting arrangement may be effected.

What is claimed is:

1. A gated diode transfer circuit, comprising a pair of bistable magnetic elements each responsive to energization to one or another binary state, an interbinary transmitting loop for transmitting binary information from one to the other of said elements, a diode serially included in said loop poled to prevent transfer of information on the read in to said one of said elements, bias potential means serially included in said loop poled and of sufficient value to prevent transfer of information on read out from said one of said elements and gating means for enabling transfer of information over said interbinary loop consisting of means for serially introducing an additional potential into said loop.

2. A gated diode transfer circuit, comprising a pair of bistable magnetic elements each responsive to energization to one or another binary state, an interbinary transmitting loop for transferring binary information from one to the other of said elements, a diode serially included in said loop poled to prevent transfer of information on read in to said one of said elements, bias potential means serially included in said loop poled to oppose transfer of information on read out from said one of said elements and gating means for controlling transfer of information over said interbinary loop consisting of means for serially introducing an additional potential into said loop.

3. The combination of a plurality of gated diode transfer circuits having in common the output coil of a first bistable magnetic element and each individually the input coil of another bistable magnetic element, a diode serially included therein poled to prevent transfer of information on read in to said first element, a source of bias potential poled to oppose transfer of information on read out from said first element and gating means for controlling transfer of information consisting of means serially included therein for introducing an additional potential therein.

References Cited in the file of this patent

UNITED STATES PATENTS

| | | |
|---|---|---|
| 2,525,106 | Wendt | Oct. 10, 1950 |
| 2,611,025 | Jankawski | Sept. 16, 1952 |
| 2,673,337 | Avery | Mar. 23, 1954 |
| 2,683,819 | Rey | July 13, 1954 |
| 2,685,644 | Toulon | Aug. 3, 1954 |
| 2,695,993 | Haynes | Nov. 30, 1954 |

OTHER REFERENCES

Publications:

"Investigation for Design of Digital Calculating Machinery," Progress Report No. 2 of Computation Laboratory, Harvard U.

"Typical Block Diagrams for a Transistor Digital Computer," Electrical Engineering, vol. 71, Issue 12, December 1952.

"A High Speed Shift Register Using Magnetic Binaries," Paper "150," presented at LRE National Convention, March 5, 1952 (pages 5–8).